Jan. 27, 1953
G. K. JENSEN ET AL
2,627,033
FREQUENCY METER
Filed Dec. 1, 1949
7 Sheets-Sheet 5
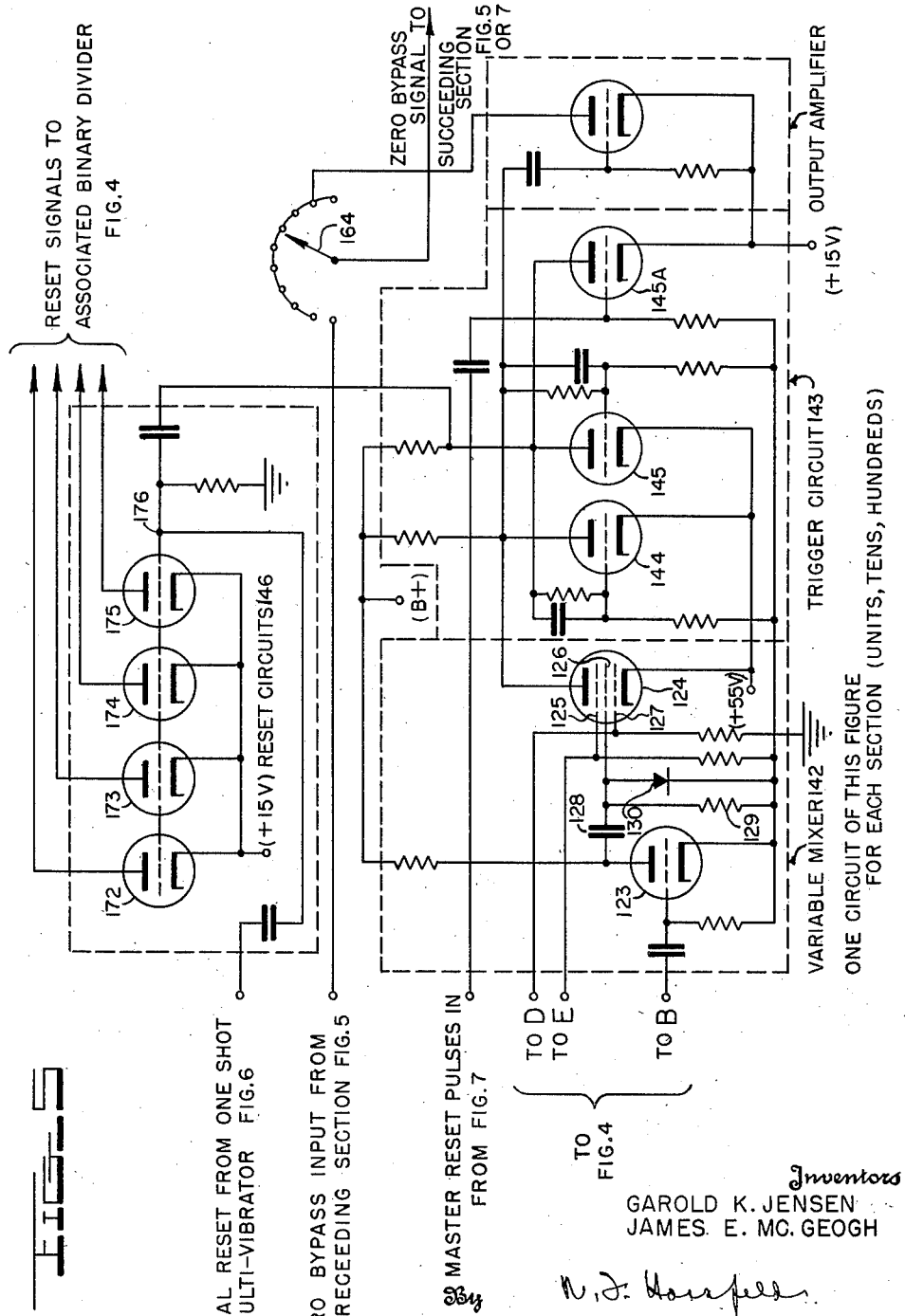
Inventors
GAROLD K. JENSEN
JAMES E. MC. GEOGH
By
ATTORNEY

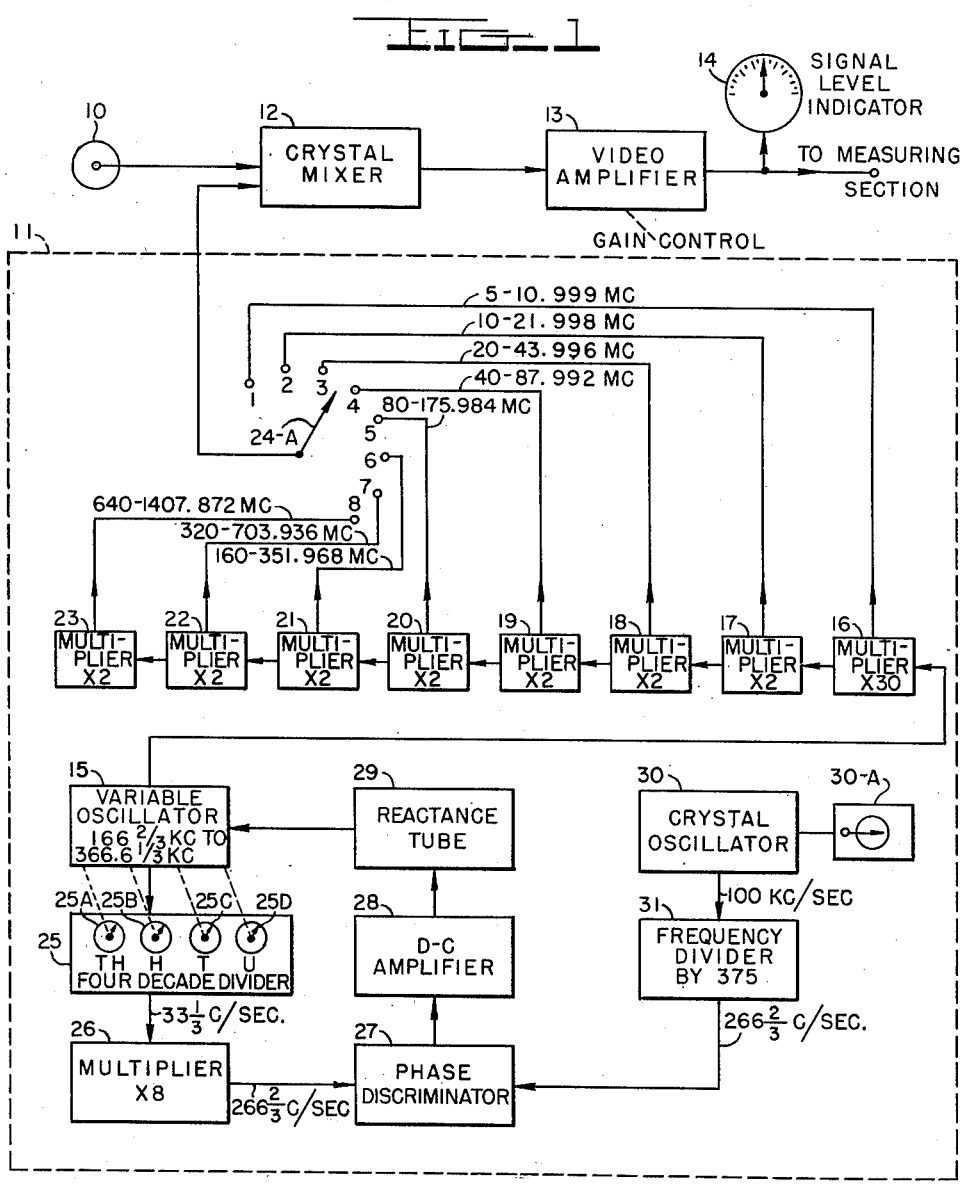

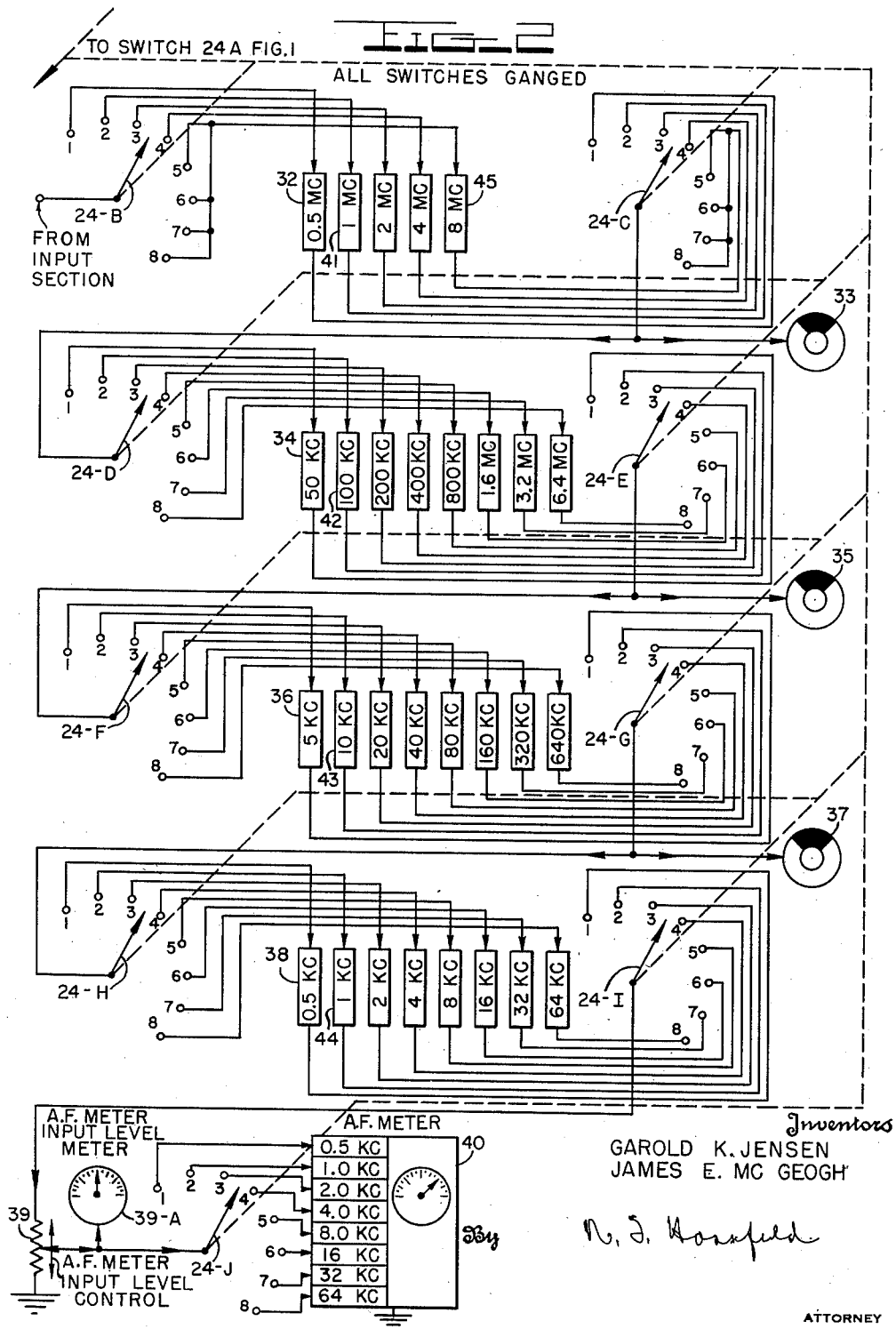

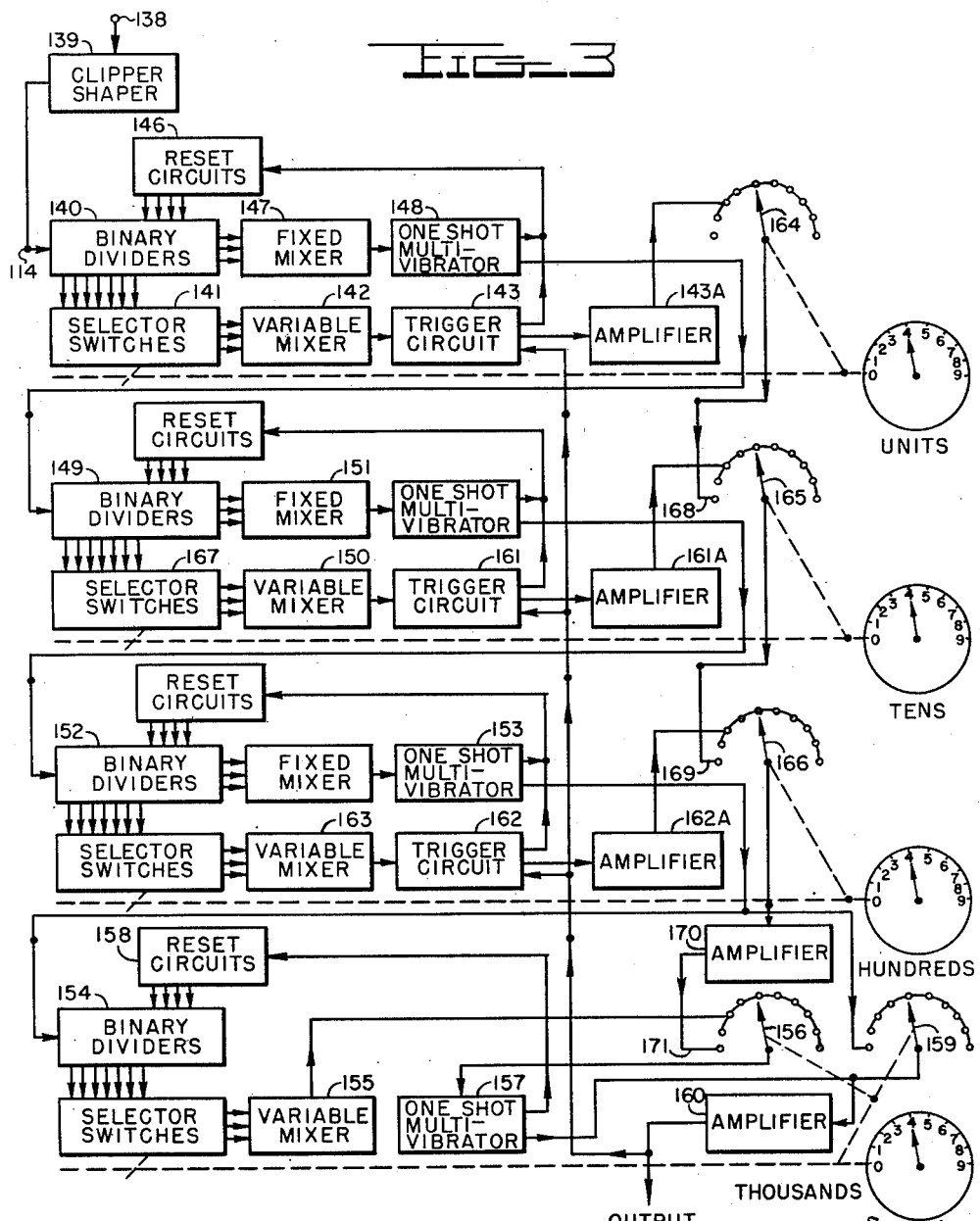

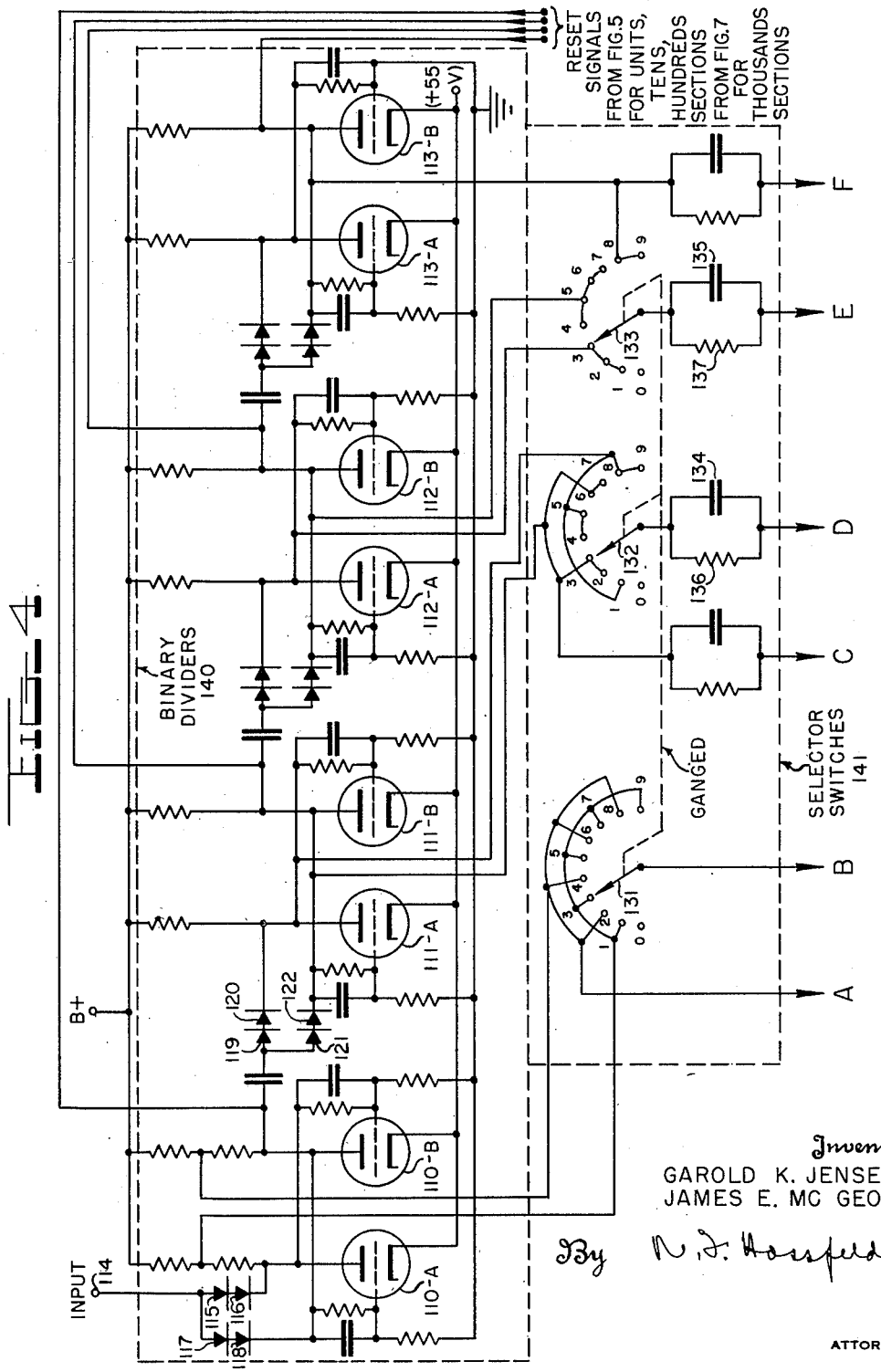

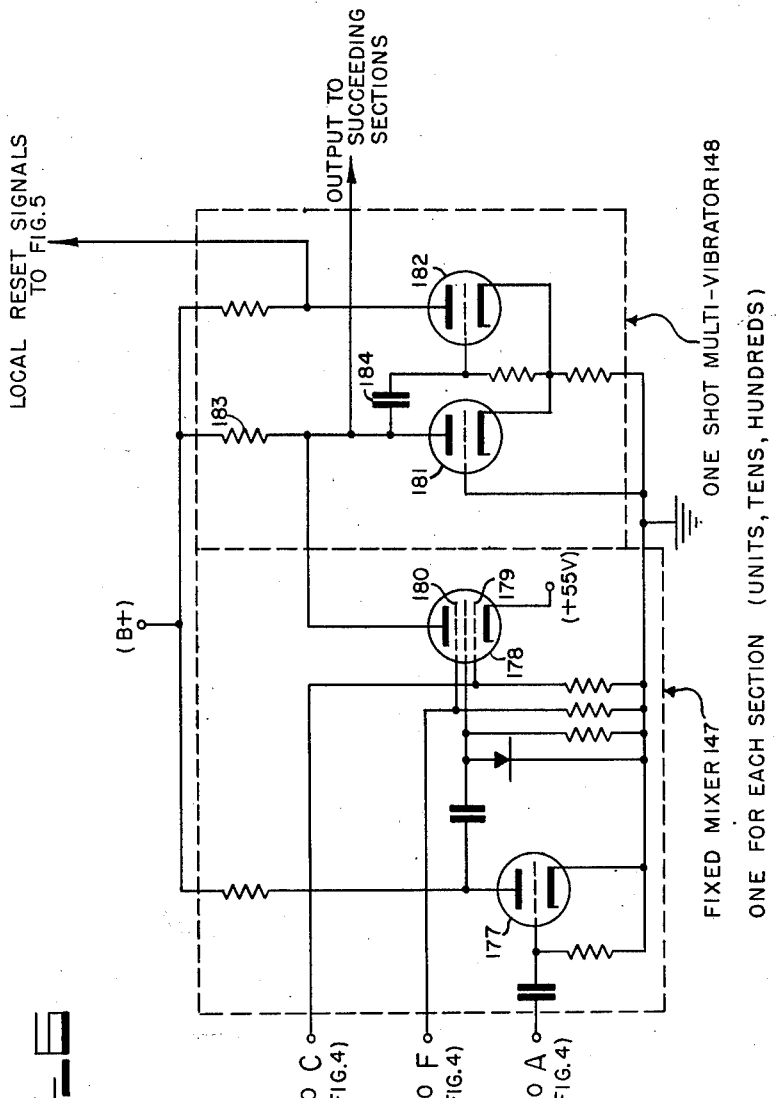

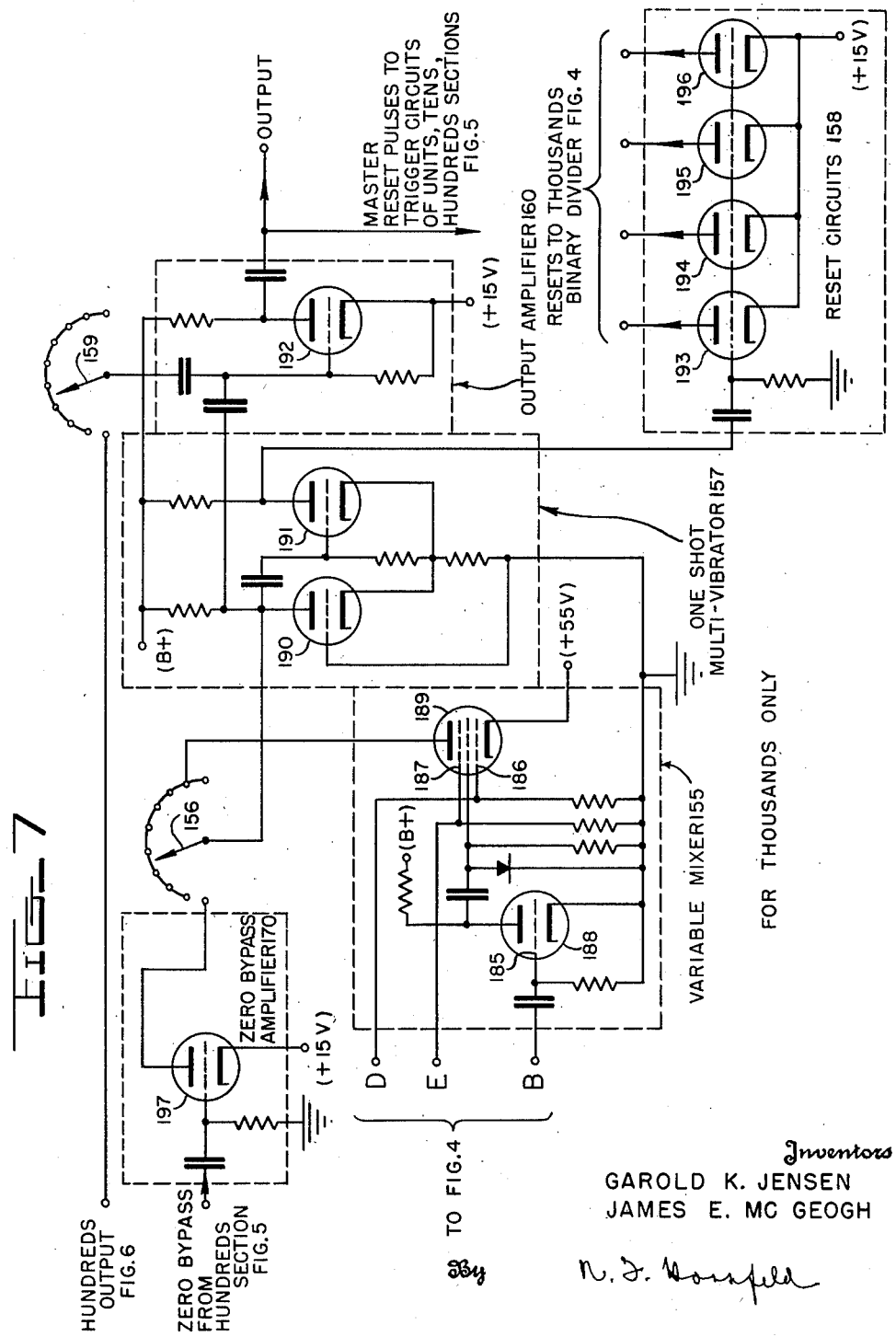

Patented Jan. 27, 1953

2,627,033

UNITED STATES PATENT OFFICE 2,627,033

FREQUENCY METER

Garold K. Jensen, Pinecrest, Va., and James E. McGeogh, Silver Spring, Md.

Application December 1, 1949, Serial No. 130,573

9 Claims. (Cl. 250—39)

(Granted under Title 35, U. S. Code (1952), sec. 266)

This invention relates to frequency measurement and signal generation devices and in particular to devices of this type possessing a heretofore unavailable flexibility and rapidity of manipulation to obtain extremely accurate measurement of the frequency of a signal occurring anywhere in a wide range or to provide a signal of accurately controlled characteristics in that range.

Heterodyne frequency meters have seen extensive use in the past. Virtually every radio experimenter is familiar with the LM and BC-221 meters used so universally during and after the last war. These instruments provide fairly accurate results but have severe limitations as anyone who attempted to use them without an auxiliary radio receiver itself quite closely calibrated doubtlessly discovered. The overall disadvantage of operation on harmonics with a narrow fundamental range, the usual type of operation for these meters, together with the time consuming process of checking a variable oscillator against a crystal oscillator, and reading calibration charts several times makes frequency measurement over even a narrow frequency range a slow operation.

It is accordingly an object of the present invention to provide a frequency meter of modest size which can provide extremely accurate and rapid frequency measurements over a wide frequency range without auxiliary calibration charts.

Another object of the present invention is to provide a frequency meter which will cover a wide range of frequencies permitting a rapid search of the entire range without recalibration.

Another object of the present invention is to provide a signal generator which will deliver output signals selectable at will to any of a large number of frequencies occurring over a wide frequency range.

Other and further objects and features of the present invention will become apparent upon a careful consideration of the following detailed description when taken in conjunction with the accompanying drawings, in which:

Figs. 1 and 2 show principally in block form, a typical embodiment of the features of the present invention. These figures appear on two sheets of the drawings with notation as to the proper method of interconnection.

Figs. 3, 4, 5, 6 and 7 show various details of a frequency divider particularly useful in practicing the teachings of the present invention.

In accordance with the fundamental concepts of the present invention a frequency meter is provided which is capable of covering a wide frequency range, typically 5 to 1400 megacycles per second with an accuracy of 0.0003 percent. Decade frequency selectors, together with a multiplication factor selector are the primary controls and from the positions of these selectors and the reading of an audio frequency meter, the frequency of the incoming signal is readily and rapidly determined without use of an auxiliary receiver or reference to calibration charts.

Heterodyne operation is utilized, that is, an incoming signal is heterodyned or beat with a locally generated signal and measurements made of the beat frequency signal. The locally generated signal is controlled in frequency in decade arranged steps (multiples of 1, 10, 100, 1000) and the pass bandwidth of the beat frequency measuring device is similarly adjusted in decade steps. Measurement of audio beat frequencies is made with an audio frequency meter. In this manner with a typical instrument of small size it is possible to search the entire 5 to 1400 megacycle per second frequency range with extreme rapidity.

The basic features of the present invention are shown in the form of a block diagram appearing on two sheets of the drawing as Figs. 1 and 2. Actually the two figures together constitute the apparatus of the invention as either part, alone, is incapable of satisfactory operation of the cooperative type herein envisioned. Only where the apparatus of the two sections is combined as an integrated whole is the full utility of the present invention realized. The apparatus of Fig. 1 is primarily the input section containing an input signal terminal 10, a decade step frequency signal generator 11, crystal mixer 12, wide band video frequency amplifier 13, and a signal level indicator 14. The apparatus of Fig. 1 supplies signals to the measuring section of Fig. 2 which contains decade-step beat frequency measuring and indicating components.

Referring now to Fig. 1, the decade step frequency signal generator contains as the primary signal source a variable oscillator 15 which is rigidly controlled in frequency. In a typical case where a low frequency limit of 5 to 10 megacycles per second is desired, this oscillator may cover the range 166 ⅔ kc. to 366.6 ⅓ kc. which after simple multiplication by a factor of 30 in multiplier 16 provides basic signals variable over the range 5 to 10.99 mc. identified as band 1.

Successive multiplication by factors of two in the additional multipliers 17 through 23 provides the additional bands 2 through 8 in the tabulation below:

| Band | Frequency range (megacycles per second) |
| --- | --- |
| 1 | 5–10.999 |
| 2 | 10–21.998 |
| 3 | 20–43.996 |
| 4 | 40–87.992 |
| 5 | 80–175.984 |
| 6 | 160–351.968 |
| 7 | 320–703.936 |
| 8 | 640–1407.872 |

Of advantage in many cases is the fact that an overlap between adjacent bands exists. This operation is very helpful where the unknown signal is near such common frequencies as the lower limit of each of bands 2 through 8 in the above tabulation.

Selection of the bands 1 through 8 is accomplished through the manual operation of a multiposition switch 24–A which selects the output of one of the multipliers 16 through 23 for application to the crystal mixer 12.

Variable oscillator 15 is controlled to maintain an exact selected frequency by a control signal path including the four decade frequency divider 25, a frequency multiplier 26, phase discriminator 27, D. C. amplifier 28, and reactance tube 29. Discriminator 27 also receives a signal from a high stability, temperature controlled crystal oscillator 30, operative typically at 100 kc./sec., delivered through a fixed ratio frequency divider 31 which effects division by a factor of 375. With this division ratio the signal delivered to discriminator 27 from crystal oscillator 30 is at the frequency of 266⅔ cycles per second. Discriminator 27 derives control signals in dependency on the correspondence between this signal of accurately controlled 266⅔ cycles per second frequency with signals from multiplier 26. These control signals are amplified in D. C. amplifier 28 to vary the characteristics of the reactance tube circuit 29 to vary the frequency of variable oscillator 15 in such a manner that the output signal of multiplier 26 is held at the frequency of 266⅔ cycles per second and in phase with the 266⅔ cycle per second signal from frequency divider 31.

The frequency of variable oscillator 15 at which such correspondence between the two 266⅔ cycle per second signals exists may be at any of 5,999 frequencies in the range from 166⅔ kilocycles per second to 366.6⅓ kilocycles per second depending upon the division ratio effected by the four decade divider 25. This divider 25 may be adjusted to provide division by any selected whole number ratio over the range of 5000 to 1 to 10,999 to 1. Divider 25 provides this whole number division under control of manually operated factor of ten switches (decades) directly calibrated in terms of frequency on the lowest output band 5–10.999 mc. These switches are indicated on Fig. 1–A by the letters TH, H, T, U which correspond respectively to the thousands, hundreds, tens, and units decimal digits of the division ratio. The thousands digit has only six possible values 5, 6, 7, 8, 9 and 10 hence the switch for this digit can have as few as six positions appropriately calibrated. Each of the hundreds, tens and units digits has ten possible values 0 through 9 hence ten position switches are used at these locations.

The switch 24–A provides output signals carrying relationships at multiples of 2 with respect to the calibrations on the decade divider 25 hence the eight positions of this switch numbered 1 through 8 on Fig. 1 may actually be calibrated 1, 2, 4, 8, 16, 32, 64, 128 to indicate that the actual frequency output as delivered to crystal mixer 12 is one of these multiples of the basic frequency indicated on the calibration of the decade divider 25.

To lessen the burden on the reactance tube circuit 29 to accurately control the frequency of the variable oscillator 15 over a range so wide as 166⅔ to 366.6⅓ kilocycles per second, the thousands, hundreds and tens decade selector switches of decade divider 25 are linked to the variable oscillator 15. This linkage varies the constants of the frequency establishing circuits of oscillator 15. Typically this may be a capacitance or an inductance variation. As a close approximation the change introduced by each step of each switch will be in proportion to its position in the decade, each position of the hundreds decade switch having ten times the effect of each position of the tens switch and each position of the thousands decade having ten times the effect of each position of the hundreds decade. By way of illustration, when divider 25 is set for a division ratio of 5000 to 1, that is the minimum division ratio, then the oscillator is tuned to 166⅔ kc. When the division ratio is adjusted to 10,999 to 1 the oscillator by its linkage to divider 25 is tuned to 366.6⅓ kilocycles. In this manner the reactance tube circuit and others associated therewith are relieved of considerable variation to maintain a desired frequency of operation.

The decade divider 25 appears in a co-pending patent application Serial Number 130,572, entitled Frequency Divider, filed December 1, 1949, in the name of Garold K. Jensen, now Patent No. 2,563,841, and is therein described in detail. Drawings of that application have been included as Figs. 3, 4, 5, 6 and 7 of the present invention to indicate more specifically the apparatus thereof. These drawings will be described in detail at a later point in the specification.

The beat frequency measuring circuits of Fig. 2 are of novel arrangement designed to cooperate with the decade controlled frequency divider 25 and the multiplier control 24–A to provide new circuit simplicity and apparatus compactness together with a speed of search of an extremely wide frequency range typically 5 to 1400 megacycles per second.

The frequency measuring circuits of Fig. 2 consist primarily of a plurality of filters of different bandwidths arranged in banks having basically the same harmonic relationship within banks as the output of the multipliers 16 through 23 and a decade relationship between banks. Selection of the filters is accomplished by a plurality of ganged switches 24–B through 24–J all operated with mechanical linkage to switch 24–A.

To follow a typical beat signal path from the video amplifier 13 (Fig. 1) through the filter circuit, that path for position 1 of the gang switch 24 may be chosen. In this position, the video signal goes through switch 24–B then through a low-pass filter 32 which has a bandwidth of 0.5 megacycles per second to switch 24–C. From switch 24–C the signal goes to indicator 33 which typically is an electric eye. The indicator 33 which may include rectification elements provides an indication if the beat signal is below 500 kilocycles per second. The signal from switch 24-C is also delivered to switch 24-D, which in its number 1 position delivers the signal to low-pass filter 34 of 50 kilocycles bandwidth. Output from filter 34 goes through switch 24-E to indicator 35 and also through the additional switch 24-F to a 5 kc. low-pass filter 36. In this manner indicator 35 will also provide indication as well as indicator 33 if the beat signal is below 50 kc.

Output from filter 36 also goes through switch 24-G to indicator 37 to provide indication when the beat signal is of a frequency less than 5 kc. The same signal goes to switch 24-H and thence to another filter bank including filter 38 having a 500 cycle bandwidth. Filter 38 delivers its output through switch 24-I, signal level control potentiometer 39 and switch 24-J to audio-frequency meter 40 which gives as a meter reading the frequency of the audio beat note when under 500 cycles per second. Level control potentiometer 39 is adjusted to hold the amplitude of the signal applied to meter 40 to a fixed value to improve the accuracy thereof.

In a similar manner for position 2 of band switch 24 (10.000 to 21.998 mc.) the filters 41, 42, 43 and 44 will be used and the 1.0 kilocycle range of meter 40 will be in use.

For any position of the band switch 24 it is then possible to progressively adjust the decade related switches of the frequency divider 25 (Fig. 1) until the beat frequency between the signal delivered to mixer 12 from switch 24-A and the signal from a signal source connected to terminal 10 is reduced to a low frequency within a range which may be read directly on meter 40.

For searching each of the low frequency bands (positions 1, 2, 3, 4 and 5 of switch 24) the operation is extremely simple. The thousands digit of the basic range (.5000 to 10.999 mc.) (position 1 of ganged switches 24) is obtained simply by moving the thousands decade switch through to all of its six possible positions in sequence. Any signal present in this basic range will give an indication on indicator 33. This operation can be extremely rapid. To search the entire region from 5 to 175.984 megacycles per second, (bands 1, 2, 3, 4 and 5) it is merely necessary to move the thousands selector switch 25-A of decade divider 25 (Fig. 1) through each of its six positions for each position 1 through 5 of the band switch 24. Once an indication of signal presence is obtained on thousands indicator 33, manipulation of switches 24 and 25-A is stopped and the hundreds decade selector switch 25-B is moved through its ten positions to obtain an indication of signal presence on hundreds indicator 35, giving by the calibration of switch 25-B the value of the hundreds digit of the fundamental range. Similarly, manipulation of the tens decade switch 25-C to obtain an indication of signal presence on indicator 37, will subsequently give the value of the tens digit of the fundamental range.

The units digit of the fundamental range is then determined by moving the units decade selector switch 25-D until a reading is obtained on the audio frequency meter 40. At this point the potentiometer 39 is adjusted to supply the signal to meter 40 at a known level or amplitude to improve reading accuracy.

The readings of the decade switches 25-A, -B, -C, -D directly give the first four decimal digits of the frequency value of the first fundamental range (5-10.999 mc.). This reading is multiplied by one of the following factors depending upon the position of band switch 24 which provides the reading.

| Bandwidth Position | Factor |
| --- | --- |
| 1 | 1 |
| 2 | 4 |
| 3 | 8 |
| 4 | 16 |
| 5 | 32 |

For convenience the band switch 24 may be calibrated directly in the factor as tabulated.

To the frequency readings obtained from the decade switches and the multiplier (band switch) must be added or subtracted the value read on the audio frequency meter 40. Since the audio frequency beat may be either plus or minus, the switch 30-A is provided in conjunction with the crystal oscillator 30 of Fig. 1 to determine whether the audio reading must be added or subtracted. Switch 30-A may be connected to a padder condenser to lower the frequency of oscillator 30 by 1⅔ cycles per second. Thus if the audio frequency reading increases by 10 percent it will be an indication that the audio frequency beat is above the decade indication and must be added to the multiplied decade reading. If the audio frequency reading does not increase by 10 percent when this control 30-A is operated, the audio frequency must be subtracted from the multiplied decade reading. The 1⅔ cycle change in the crystal oscillator introduces a change of 10 percent of full scale audio frequency reading for each band.

The tremendous flexibility of operation and speed of search possible with this apparatus comes about partly as a result of the fact that on all the low bands 1 through 5 (5 to 175.984 mc.) the frequency steps produced by manipulation of the thousands decade switch 25-A are not greater than twice the bandwidth of the connected filter of the bank of filters controlled by the band switch sections 24-B and 24-C. For example the band 5 extends from 80 to 175.984 mc., a range of 95.984 megacycles. This must be covered in six steps, the six positions of switch 25-A. Since beat frequencies may be obtained when the input signal to terminal 10 is above the frequency of the signal delivered from band switch section 24-A as well as when it is below the frequency, each filter is capable of covering an input signal range equal to twice its bandwidth. Thus the 8 megacycle per second bandwidth filter 45 used in position 5 of switch 24 is capable of covering 16 megacycles of input frequency. Such coverage is adequate because when multiplied by 6 (the number of possible positions of switch 25-A) an overall range of 96.00 megacycles may be covered. Such a range is slightly greater than the 95.984 required for the band 5.

For similar operation in just six steps of switch 25-A on the high bands 6, 7 and 8, filters having bandwidths of 16, 32 and 64 megacycles per second, respectively, are required. Furthermore the video amplifier 13 requires a bandwidth equal to that of the widest filter or 64 megacycles per second. Such bandwidths are rather extreme and with the sacrifice of some search speed on the high bands they may be avoided. To avoid such bandwidths, it is necessary to vary the frequency of the variable oscillator 15 by small increments so that each step in frequency at the output of band switch section 24-A will not exceed 16 megacycles per second. This will be satisfied by switching through each of the ten positions of the hundreds decade switch 25-B for each of the six positions of the thousands decade switch 25-A. Such operation is followed for the complete search of each of the high bands 6, 7 and 8.

In actual design of the apparatus it is impossible to secure filters which have absolutely sharp cut-off characteristics, hence, there is always the possibility of erroneous readings introduced by the transmission of energy near the end of the filter passband. Thus a single signal may appear at several points on the decade switches. Errors from this source may be eliminated, however, by several operating procedures somewhat different from the above outline.

For each of the low bands 1, 2, 3, 4 and 5, the hundreds decade control 25-B should be set to 5 (the 0.500 position) while manipulating the thousands decade control 25-A through its six positions. When a signal is noted on the thousands indicator 33, the tens decade control 25-C is set to 5 (the 0.050 position) and the hundreds decade control 25-B adjusted to obtain a signal on the hundreds indicator 35. Following this, the units decade control 25-D is set to 5 (the 0.005 position) and the tens decade control is adjusted to provide an output on indicator 37. The last step in the search of each low band is the adjustment of the units decade control 25-D to the one position thereof which will produce an indication on the meter 40.

For each of the high bands 6, 7 and 8 the tens decade control 25-C is set to 5 and then the hundreds indicator 35 is observed while the hundreds decade control 25-B is turned through its ten positions for each of the six positions of the thousands decade control 25-A. When a signal is observed on the hundreds indicator 35, the units decade control 25-D is set to 5 and the tens decade control 25-C adjusted through its ten positions to obtain an indication on indicator 37. Units decade control 25-D is then adjusted to obtain a reading on the audio frequency meter 40.

An example of where this offsetting of a lower decade control while adjusting an upper decade control provides improved accuracy may be cited. Take for example an unknown frequency signal source which is actually operating at 6.05 megacycles. Band switch 24 setting of 1 (5-10.999 mc.) would be used. The last three decades, hundreds, tens, units are set to 5-0-0 respectively. In this condition it will in all probability be possible to get a reading of the thousands indicator 33 for both settings 5 and 6 of the thousands decade 25-A because settings of 6-5-0-0 and 5-5-0-0 would produce beat frequencies of 495 and 505 kilocycles respectively, both of which would probably be transmitted by filter 32. This ambiguous condition is readily resolved when the tens decade control 25-C is set to position 5 and the hundreds decade control 25-B adjusted to secure a reading on indicator 35. For this condition in adjusting the hundreds decade control 25-B, the closest hundreds setting for the thousands decade position of 5 would give an overall setting of 5-9-5-0 to produce a beat note of 100 kilocycles with the unknown and such a beat would be definitely rejected by filter 34. On the other hand the closest overall setting for the position of 6 on the thousands decade control 25-A is 6-0-5-0. In this setting the local signal is at 6.05 megacycles, a condition of zero beat which will prevent the indication on the thousands indicator 33. The presence of a signal can still be indicated by the signal level indicator 14, however, and its presence can be readily determined by manipulation of the tens decade control 25-C to a position such as 4 or 6 either of which will produce a 10 kilocycle beat which will be shown by indicator 35, and signal level indicator 14.

For certain frequencies double adjustments may be obtained on any of the first three decade controls 25-A, -B, -C. In all such cases however, it is impossible to adjust the units control 25-D to obtain a reading on audio frequency meter 40 for the wrong adjustment. Positioning of the controls to the second position of indication will permit frequency measurement.

The condition of zero beat which causes removal of indications from the thousands, hundreds, and tens indicators 33, 35, 37 and the audio frequency meter 40 may be analysed to advantage by operating the crystal oscillator offset switch 30-A which will move the frequency of the local signal sufficiently to cause the indicators to show the presence of a signal.

To explain details of the decade step frequency divider reference is first made to Fig. 3 of the drawings, which shows a frequency divider circuit principally in block form. Terminal 138 in the upper left hand corner receives the input signals. These signals may be of a pulse nature or a sinusoidal nature as typical illustration. For the latter type of input signals it is desirable to obtain short duration pulse type signals to which end the clipper shaper 139 is employed. The output from this clipper shaper 139 is applied to the terminal 114 of a group of binary dividers 140 which are typically constructed in accordance with the circuit shown in Fig. 4, having several stages of scale-of-two counter circuits which will exist in various combinations of conductivity conditions for various input signals. Selector switches in block 141, Fig. 3, are connected to the divider 140 to provide output signals for selected combinations of binary divider conditions. For example, if the units digit of the division ratio corresponds to the numeral 8, then the selector switches 141 are set, as hereinafter described, to produce an output signal at the end of a count of 8. When this selected combination of binary divider conditions is attained, the variable mixer 142 supplies a keying signal to the trigger circuit 143 to produce an output pulse signal. Trigger circuit 143 is preferably of the Eccles-Jordan type possessing two conditions of stability and having two separate input signal paths. In an initial condition of stability, trigger circuit 143 is responsive to signals from variable mixer 142 which signals can initiate the second condition of stability therein. In this condition subsequent signals from variable mixer 142 are ineffective until the first condition of stability is again obtained responsive to a reset signal obtained from the output amplifier 160 as later explained.

Upon triggering of the circuit 143 by a signal from the variable mixer 142, a pulse type signal is supplied to the reset circuits 146 to reset the binary dividers 140 to the reference condition.

In addition to the previously described connections to the binary divider circuit 140 through selector switches 141, additional fixed position output connections are made to anodes of the binary dividers in a combination indicative of the count of ten. These fixed connections supply signals to fixed mixer 147 which may be similar to the variable mixer 142. In this manner after the trigger circuit 143 is operated by variable mixer 142 resetting binary dividers 140 to the reference condition, variable mixer 142 is inoperative and binary dividers 140 will continue to register input signals until the count of ten is registered. Upon each registry of this count of ten, fixed mixer 147 becomes operative to trigger the one-shot multivibrator 148 which as its name implies possesses one single sable state together with an unstable state which may persist for a short period of time. The output signal from this one-shot multivibrator 148 is also supplied to the reset circuits 146 to provide reset of the binary dividers 140 to an initial or reference combination of conductivity states. In this manner after the initial count corresponding to the units value of the division ratio is registered by the binary dividers 140, trigger circuit 143 is inoperative and one signal is obtained at the one-shot multivibrator 148 for each ten succeeding input signals.

The output from one-shot multivibrator 148 is supplied to the binary dividers 149 of a succeeding decade circuit for the tens digit of division. These circuits are identical to those previously described for the units digit selector, however the signals as obtained from the one-shot multivibrator 148 are of a pulse nature so that a clipper-shaper such as 139 is not normally required. The value of the tens decimal digit is registered by the binary dividers 149 to produce conduction by the variable mixer 150 with subsequent reset of binary dividers 149 through trigger circuit 161. After this reset the tens dividers also count in multiples of ten through operation of the fixed mixer 151 with reset circuits as before and provides signals to the hundreds digit section.

The apparatus for the hundreds digit may be identical in design and operation to that of the tens digit, first counting off the selected value of the hundreds digit then counting in multiples of ten providing output pulses from the one-shot multivibrator 153 which are supplied to the thousands binary divider 154.

Since the maximum division ratio required to cover the desired frequency range of the apparatus is 10,999 to 1, only four digit circuits are required. The last or thousands digit circuits are somewhat different from those for the previous digits since there is no longer the necessity for counting in multiples of ten after the value of the thousands digit is registered. For this reason the fixed mixer such as 147 and the one-shot multivibrator such as 148 of the units digit section are not present in the circuit for the thousands digit. Instead, output signals from the variable mixer 155 which again may be similar in construction to the variable mixer 152, are supplied through a multiple position switch 156 to a one-shot multivibrator 157.

Output pulse signals from the one-shot multivibrator 157 are supplied first to reset circuits 158 to provide reset of the thousands binary dividers 154 to reference conditions. Additionally output signals from one-shot multivibrator 157 are supplied to amplifier 160 from which they are obtained as output frequency divided pulse type signals. Each signal from amplifier 160 is also delivered to each of the bi-stable triggering circuits 143, 161 and 162 to return them to the condition wherein they are responsive to signals from the corresponding variable mixers 142, 150 and 163. At this point and by the action of trigger circuits 143, 161 and 162 all binary dividers and trigger circuits are again in the initial reference condition from which another complete cycle of operation as thus described may commence.

The type of operation thus described will take place whenever there is a value other than zero set in each of the division ratio selectors. To provide operation for the division ratios wherein zero might appear in one of the digit positions, additional circuitry is involved. In the first place the multiple position switches 164, 165, 166 and 156 compensate for the presence of a zero in any of the tens, hundreds and thousands digit selectors. The switches 164, 165, 166 and 156 are ganged with corresponding decimal digit selector switches that is, switch 164 is ganged for operation through ten positions with the selector switches 141, switch 165 is ganged for operation with the selector switches 167 and so on. When switch 164 is in any position other than zero position it supplies a signal from trigger circuit 143 and associated amplifier 143-A to terminal 168 at the #1 position of switch 165 each time the value of the units digit is registered by binary dividers 140 at the start of a division cycle. If switch 165 is in the zero position when such signal is received, that signal is delivered to terminal 169 of switch 166. Again if switch 166 is in the zero position the same signal is delivered to amplifier 170. If also switch 156 is in the zero position, signals from amplifier 170 appearing at terminal 171 will be delivered to the one-shot multivibrator 157 to cause operation thereof to provide an output signal from amplifier 160. This operation is experienced whenever the division ratio is nine to one or less. Where a zero in the division ratio is for a lower order digit such as the units digit, the selector switches 141 as later described will prevent operation of the variable mixer 142. However the fixed mixer 147 will still operate providing an output signal for each ten input signals. It is these signals that are delivered for counting by the succeeding decade stage as originally described.

Details of the components shown in block form in Fig. 3 are shown in additional figures and will now be discussed. With reference first to Fig. 4, details are shown therein of a typical multi-stage scale-of-two counter as employed in the digit dividers 140, etc. for each digit of the frequency division ratio. The fundamental features of this multi-stage scale-of-two counter circuit are probably familiar, each stage being of the Eccles-Jordan type having two tubes receiving an input signal at a first frequency and providing an output signal at half that frequency. To provide a possible ten positions, or combinations of counter stages, four scale-of-two counter circuits connected in cascade are employed. It should be borne in mind that on all of Figs. 4, 5, 6 and 7, dotted in portions are shown to indicate generally the portions of each schematic drawing corresponding to the blocks of Fig. 3.

The apparatus of Fig. 4 is shown as having triode type electron tubes 110-A, 110-B, 111-A, 111-B, 112-A, 112-B, 113-A and 113-B. These tubes are cross-connected in pairs in which only one tube of each pair can be conductive at any instant. Typically the pulse type input signals are applied at input terminal 114. These signals are delivered through unilateral impedance coupling elements such as the crystal diodes 115, 116, 117 and 118 to the grids of tubes 110-A and 110-B in parallel. As polarized, the unilateral impedance elements are set to deliver only negative pulses to the tube grids to produce current cut off of the conductive tube of the pair thereby initiating trigger action. Thus the circuit of tubes 110-A and 110-B will operate from one conductivity condition to another undergoing a complete cycle of operation in response to two successive input pulses at terminal 114.

The anode of tube 110-B is connected through unilateral impedance elements 119, 120, 121 and 122 which may also be of the crystal diode type to the grids of tubes 111-A and 111-B in parallel which are connected in a second trigger circuit similar to the first. Responsive to each initiation of current flow in tube 110-B, the negative voltage surge at the anode thereof produces cut off of the conductive tube 111-A or 111-B. Since each second input pulse at terminal 114 will provide this condition of tube 110-B, two complete cycles of operation of the circuit of tubes 110-A and 110-B (4 input pulses) are required to produce a cycle of operation of the circuit of tubes 111-A and 111-B.

In a similar manner a third trigger circuit of tubes 112-A and 112-B is connected to the anode of tube 111-B and experiences a complete cycle of operation for each two cycles of operation of circuit 111-A and 111-B. Likewise a fourth circuit of tubes 113-A and 113-B is connected to the anode of tube 112-B for half frequency operation therefrom.

An initial reference state for the trigger circuits may be selected in which all of the right hand tubes are conductive (110-B, 111-B, 112-B, 113-B). In this "zero" condition all of the left hand anodes are near (B+) potential. After a first input pulse to terminal 114, tube 110-A will be conductive and the plate of tube 110-B near (B+) potential. These conditions as well as for those brought about in this and other trigger circuits upon application of nine additional input pulses are tabulated below.

the potential of screen grid 126, considerable current must be supplied thereto. This current is provided by the operation of the amplifier tube 123 whose anode is coupled to grid 126 through capacitance 128. Resistance 129 provides a return current path for capacitance 128 and unilateral impedance element 130 "clamps" the grid 126 to suppress negative excursions thereof.

Application of signals from the typical counter tubes of Fig. 4 to the grids or gating circuits as shown in Fig. 5 is accomplished through the three section multiple position switches indicated in Fig. 4 by numerals 131, 132 and 133. These switches are ganged together and may be operated manually with rotation in synchronism for each decimal digit unit. The grid of tube 123 (Fig. 5) is connected to the movable contact of switch 131 (terminal B), grid 127 of tube 124 (Fig. 5) is connected to the movable contact of switch 132 (terminal D) while the grid 125 of tube 124 (Fig. 5) is connected to the movable contact of switch 133 (terminal E). In accordance with the tabulation previously given for the various "counts," corresponding stationary contacts for the switches 131, 132, 133 are connected to appropriate anodes of the counter tubes, connection being made to tubes having positive (+) designation. Connections of the stationary contacts for the zero position of switches 131, 132, 133 is not required. For the thousands digit the possible values are 5, 6, 7, 8, 9 and 10. This means that the minimum division ratio is 5000 to 1 whereas the maximum is 10,999 to 1. As previously stated, only six positions are required for this thousands selector switch and connections to the stationary contacts are made in accordance with the tabulation.

The stationary contacts of switch 131 are connected in the anode circuits of tubes 110-A and

| Count | Condition of Plates (+ nonconductive; − conductive) | | | | | | | |
|---|---|---|---|---|---|---|---|---|
| | 110-A | 110-B | 111-A | 111-B | 112-A | 112-B | 113-A | 113-B |
| 0 | + | − | + | − | (+) | − | + | − |
| 1 | − | (+) | (+) | − | (+) | − | + | − |
| 2 | (+) | − | − | (+) | (+) | − | + | − |
| 3 | − | (+) | (+) | − | − | (+) | + | − |
| 4 | (+) | − | (+) | − | − | (+) | + | − |
| 5 | − | (+) | − | (+) | − | (+) | + | − |
| 6 | (+) | − | − | (+) | (+) | − | − | (+) |
| 7 | − | (+) | (+) | − | − | + | − | (+) |
| 8 | (+) | − | (+) | − | + | − | − | (+) |
| 9 | − | (+) | − | (+) | + | − | − | (+) |
| 10 | (+) | − | − | (+) | + | − | − | (+) |

The selector switches shown in block in Fig. 3, corresponding to blocks 141 etc., are represented in Fig. 4 as switches 131, 132 and 133.

For determining the state of the stages of the counter to produce output signals when selected states are reached, a form of coincidence or gate circuit is used such as the variable mixers 42, etc. A typical circuit of this nature is shown in part of Fig. 5 and includes primarily the two electron tubes 123 and 124. Tube 124 is a triple grid tube and receives at the three grids 125, 126 and 127 signals from the trigger circuit selector switches 131, 132, 133 of Fig. 4. All grids 125, 126 and 127 are normally quite heavily biased with respect to the cathode because of the plus-55 volts at the cathode. However when these grids are simultaneously brought to high potential as a result of their connection through switches 131, 132 and 133 to non-conductive anodes of the trigger circuits of Fig. 4, the anode current path of tube 124 can be rendered conductive. To raise 110-B, the stationary contacts of switch 132 in the anode circuits of tubes 111-A and 111-B, and the stationary contacts of switch 133 in the anode circuits of tubes 112-A, 112-B and 113-B.

As an illustration of this method of connection, upon inspection of the previous tabulation it is seen that for a typical count of 1, with switches 131, 132 and 133 (Fig. 4) in the (1) position, the anodes of tubes 110-B, 111-A, 112-A and 113-A are at the high potential whereas the opposing anodes are at the low potential. Connection of the high potential anodes having the positive indication enclosed in parenthesis to stationary contacts of the switches 131, 132, 133 controlling the three gating input circuits may thus be made. With this circuit arrangement each time the typical count of (1) is reached, tube 124 will be rendered conductive.

At this point it is well to note that the signal inversion introduced by tube 123 must be taken into consideration. Hence the connection of the grid of tube 123 is made to the opposite anode from that given by the plus sign in the tabulation (tube 110–A). Further, if desired, the voltage amplification produced by tube 123 may in part be counter-balanced by the connection to only a part of the total anode circuit load resistance as shown in Fig. 4. For the other trigger circuits, connection is made direct to the anode terminals.

Coupling condensers 134 and 135, Fig. 4, by-passed by resistances 136 and 137 are employed in the signal path from switches 132 and 133 to grids 127 and 125. This connection assists in the maintenance of low D.-C. potential at the grids 125 and 127 yet supplies the full signal amplitude to the grids upon occurrence of the trigger operation in a trigger circuit such as 143.

The previous mentioned trigger circuit (143) is shown in Fig. 5 having the tubes 144 and 145 together with a keying tube 145–A. This circuit receives "set" signals from the anode of variable mixer tube 124 which bring tube 144 to conduction each time it is non-conductive upon initiation of conduction by tube 124. Tube 145–A receives master reset pulses from amplifier 160 of Fig. 7 each time a quantity of input signals equal to the value of the division ratio is counted by the overall system. By these signals, tube 145–A is brought to momentary conduction to bring the trigger circuit tube 145 to conduction (reset).

Additional components of the overall apparatus which have not been previously described will now be described in considerable detail. A first component to be described appears in Fig. 5 and is identified therein as the reset circuits of block 146. As shown, these reset circuits include four biased electron tubes 172, 173, 174 and 175 which are normally non-conductive. Positive polarity input signals are applied to these tubes in parallel from the anode of tube 145 and from the one-shot multivibrator anode 182 of Fig. 6. The anodes of tubes 172, 173, 174 and 175 are connected individually to the right hand anodes of the tubes of the corresponding trigger circuits as typified in Fig. 4 and indicated thereon. With these connections each time a positive pulse is applied to reset grid terminal 176, conduction by the reset tubes through the corresponding anode load resistance of the trigger circuits of Fig. 4 will cause the trigger circuits to achieve a zero condition in which the right hand tube of each circuit is conductive.

Details of the fixed mixers such as 147 and the one-shot multivibrator such as 148 for the units, tens, and hundreds digits are shown in Fig. 6. The fixed mixer 147 includes the electron tubes 177 and 178 in circuit construction practically identical to that of the previously discussed tubes 123 and 124 in the variable mixer 142 (Fig. 5) differing therefrom only in the source of input signals. As indicated by the lettered terminals referring to Fig. 4, the grid of tube 177 receives signals from the anode of tube 110–B, grid 179 receives signals from the anode of tube 111–B and grid 180 receives signals from the anode of tube 113–B. An inspection of the previous tabulation will show that this connection corresponds to the conditions for the count of 10 wherein these anodes possess positive notation and is the first time in the sequential tabulation that such a condition appears. From this circuit arrangement therefore it is seen that tube 178 will achieve conduction each time the binary divider cooperative therewith achieves the ten count combination.

The one-shot multivibrator 148 is shown in Fig. 6 as those components associated with the electron tubes 181 and 182. By virtue of the capacitance 184 coupling the anode of tube 181 and the grid of tube 182 the normal condition for the one-shot multivibrator is that wherein tube 182 is conductive. This condition is altered however upon the initiation of conduction in tube 178 with the resulting drop in potential across resistance 183. Tube 181 is thus brought to conduction for a period of time determined primarily by the time constants of the circuits associated with capacitance 184. In this manner then, a short duration positive pulse is produced at the anode of tube 182 while a short duration negative pulse is produced at the anode of tube 181. The positive pulse from the anode of tube 182 is delivered to the reset circuits 146, Fig. 5, in a path parallel with the reset signal from trigger circuit 143. The negative signal from the anode of tube 181 goes to the succeeding binary divider 149 (Fig. 3) in the tens digit circuit as input pulses thereto.

The thousands or last decade circuit as previously mentioned is different from the circuit for the other digits in that the fixed mixer such as 147 or 151 is not employed. Additional differences will be noted in Fig. 7 which shows circuit details of the variable mixer 155, the one-shot multivibrator 157, amplifiers 160 and 170, switches 156 and 159 and reset circuits 158. The binary divider circuit 154 for the thousands section is as shown in Fig. 4 except it does not contain the fixed output paths indicated by A, C and F. Only the variable signal paths B, D and E are employed delivering signals as indicated on Fig. 7 to grids 185, 186 and 187 respectively of electron tubes 188 and 189. The circuit of these tubes 188 and 189 is again similar to the first discussed circuit of tubes 123 and 124 of Fig. 5. A difference lies however in that the output of tube 189 is connected through switch 156 to the one-shot multivibrator of tubes 190 and 191. This one-shot multivibrator may be similar in structure to the previously described multivibrator 148 of Fig. 6. The negative pulse output as obtained at the anode of tube 190 responsive to conduction by tube 189 is supplied direct to the amplifier tube 192 which is the primary component of amplifier 160 in Fig. 3. To provide output signals from the system when the thousands decade selector is in zero position the direct signal path from the hundreds decade output circuit through the zero position of switch 159 to amplifier tube 192 is included, however it should be recalled that the thousands decade selector never reaches the zero position for the purposes of the present invention.

Reset signals for the thousands binary dividers 154 (Fig. 3) are obtained from the reset tubes 193, 194, 195 and 196 of Fig. 7 and are delivered in the same manner as previously described to the right hand anodes of the binary divider circuits. These reset signals are derived from the short duration positive pulse signals from the anode of tube 191. When the thousands decade selector is in the zero position, the one-shot multivibrator 157 of tubes 190 and 191 is connected through the zero position of switch 156 and the amplifier tube 197 for operation to produce output signals responsive to zero bypassed signals from the hundreds section (switch 166 in Fig. 3).

The overall accuracy possible with a measuring system of this type is truly phenomenal.

With temperature compensation of a good crystal oscillator 30, the frequency control feedback loop will maintain the oscillator output frequency accuracy within 2 parts per million. The A.-F. meter error will be about 1% of the full scale value hence will reflect an overall system error of about 1 part per million. The sum of these two error sources is 3 parts per million or an overall error of 0.0003%. The entire apparatus may be continued in a cabinet about the size of conventional communications receivers providing in a readily portable instrument a degree of accuracy heretofore impossible. Not only this, but the ease and rapidity of operation surpasses that possible with any available equipment.

Although certain specific embodiments of this invention have been disclosed and described it is to be understood that they are merely illustrative of this invention and modifications may, of course be made without departing from the spirit and scope of the invention as defined in the appended claims.

The invention described herein may be manufactured and used by or for the Government of the United States of America for governmental purposes without the payment of any royalties thereon or therefor.

What is claimed is:

1. A frequency measurement device for determining the frequency of incoming signals comprising a signal generator for producing comparison signals variable in steps, a single mixer means combining the incoming signals and comparison signals, a plurality of low pass filters of progressively narrower bandwidth connected in sequence, each succeeding filter to the output of the preceding filter to receive the beat frequency combined signals, means indicating the presence of signals from each filter and low frequency measurement means receiving the signals from the last filter indicating the frequency of signals therefrom.

2. A frequency measurement device for determining the frequency of incoming signals comprising, signal generator means for producing a comparison signal variable in frequency by decade related steps, a single mixer means connected to said signal generator means for combining incoming signals and the comparison signal to obtain a beat frequency signal, a plurality of low pass filters connected in a sequence wherein each successive filter has an upper frequency limit which is one-tenth of the upper frequency limit of the preceding filter, the first of said filters connected to output of the mixer means, separate indicating means connected to the output of each of the aforementioned filters for indicating the presence of signal output from each, and low frequency measurement means connected to the last filter of the sequence for indicating the frequency of signals therefrom.

3. A frequency measurement device for determining the frequency of incoming signals comprising, signal generator means for producing a comparison signal variable in frequency steps wherein the steps of a first group of frequency steps are one-tenth as large as those of the succeeding group of frequency steps, and each additional group ten times as large as the preceding group, a single mixer means connected to said signal generator means for combining incoming signals and the comparison signal to obtain a beat frequency signal, a plurality of low pass filters connected in a sequence wherein each successive filter has an upper frequency limit which is one-tenth of the upper frequency limit of the preceding filter, the first of said filters connected to output of the mixer means, separate indicating means connected to the output of each of the aforementioned filters for indicating the presence of signal output from each, and low frequency measurement means connected to the last filter of the sequence for indicating the frequency of signals therefrom.

4. A frequency measurement device for determining the frequency of incoming signals comprising, signal generator means for producing a comparison signal variable in frequency steps wherein the steps of a first group of frequency steps are one-tenth as large as those of the succeeding group of frequency steps, and each additional group ten times as large as the preceding group, a single mixer means connected to said signal generator means for combining incoming signals and the comparison signal to obtain a beat frequency signal, a first low pass filter connected to the output of the mixer means, said first low pass filter having an upper frequency limit having a value approximately equal to one-half the maximum variation in the comparison signal introduced by the largest frequency steps employed, a second low pass filter having an upper frequency limit one-tenth as great as the first filter connected to the first filter and responsive to the output therefrom, additional low pass filters having bandwidth reduction relationship of the order of 10 to 1 connected in sequence and responsive to signals from the second filter, and low frequency measurement means connected to the last filter of the sequence for indicating the frequency of signals therefrom.

5. A frequency measurement device for determining the frequency of incoming signals comprising, a first signal source operative to provide a highly stable reference signal, a second signal source operative to provide a variable frequency signal, a frequency divider having adjustable division ratio responsive to the signal from the second signal source to provide a frequency divided signal at a sub-multiple of the frequency of the second signal source, control means connected to the second signal source responsive to the frequency divided signal and to the reference signal operative to control the frequency of operation of the second signal source to maintain the frequency divided signal at a constant frequency irrespective of divider division ratio, a single mixer means for deriving beat frequency signals between the variable frequency signal and incoming signals, low pass filter means connected to the mixer means to transmit selected beat frequency signals, and frequency measurement means for indicating the frequency of beat frequency signals transmitted by the filter means.

6. A frequency measurement device for determining the frequency of incoming signals comprising, a first signal source operative to provide a highly stable reference signal, a second signal source operative to provide a variable frequency signal, a multiple decade frequency divider responsive to the signal from the second signal source to provide a frequency divided signal wherein each decimal digit of the division ratio may be selected, frequency sensitive means for deriving control signals in response to frequency differences between the frequency divided signal and the reference signal, control means for the second signal source responsive to the control signals to adjust the operating frequency of the second signal source to obtain a minimum frequency difference between the frequency divided signal and the reference signal, a single mixer means for deriving beat frequency signals between the variable frequency signal and incoming signals, low pass filter means connected to the mixer means to transmit selected beat frequency signals, and frequency measurement means for indicating the frequency of beat frequency signals transmitted by the filter means.

7. A frequency measurement device for determining the frequency of incoming signals comprising, a first signal source operative to provide a highly stable reference signal, a second signal source operative to provide a variable frequency signal, a multiple decade frequency divider responsive to the signal from the second signal source to provide a frequency divided signal wherein each decimal digit of the division ratio may be selected individually, frequency sensitive means for deriving control signals in response to frequency differences between the frequency divided signal and the reference signal, control means for the second signal source responsive to the control signals to adjust the operating frequency of the second signal source to obtain a minimum frequency difference between the frequency divided signal and the reference signal, frequency multiplying means for increasing the frequency of the variable frequency signal by whole number factors to provide a frequency multiplied signal in a desired frequency range including the frequency of the incoming signal, a single mixing means connected to said last named means and responsive to incoming signals operative to combine the frequency multiplied signal and incoming signals, to produce beat signals, low pass filter means connected to the mixer means to transmit selected beat frequency signals, and frequency measurement means for indicating the frequency of beat frequency signals transmitted by the filter means.

8. A frequency measurement device for determining the frequency of incoming signals comprising, a first signal source operative to provide a highly stable reference signal, a second signal source operative to provide a variable frequency signal, a multiple decade frequency divider responsive to the signal from the second signal source to provide a frequency divided signal wherein each decimal digit of the division ratio may be selected individually, frequency sensitive means for deriving control signals in response to frequency differences between the frequency divided signal and the reference signal, control means for the second signal source responsive to the control signals to adjust the operating frequency of the second signal source to obtain a minimum frequency difference between the frequency divided signal and the reference signal, frequency multiplying means for increasing the frequency of the variable frequency signal by whole number factors to provide a frequency multiplied signal in a desired frequency range including the frequency of the incoming signal, a single mixing means connected to said last named means and responsive to incoming signals operative to combine the frequency multiplied signal and incoming signals, to produce beat signals, a plurality of low pass filters connected in a sequence wherein each successive filter has an upper frequency limit which is one-tenth of the upper frequency limit of the preceding filter, the first of said filters connected to output of the mixer means, and low frequency measurement means connected to the last filter of the sequence for indicating the frequency of signals therefrom.

9. A frequency measurement device for determining the frequency of incoming signals comprising, a first signal source operative to provide a highly stable reference signal, a second signal source operative to provide a variable frequency signal, a multiple decade frequency divider responsive to provide a frequency divided signal wherein each decimal digit of the division ratio may be selected individually, frequency sensitive means for deriving control signals in response to frequency differences between the frequency divided signal and the reference signal, control means for the second signal source responsive to the control signals to adjust the operating frequency of the second signal source to obtain a minimum frequency difference between the frequency divided signal and the reference signal, frequency multiplying means for increasing the frequency of the variable frequency signal by whole number factors to provide a frequency multiplied signal in a desired frequency range including the frequency of the incoming signal, a single mixing means connected to said last named means and responsive to incoming signals operative to combine the frequency multiplied signal and incoming signals, to produce beat signals, and means for determining the frequency of beat signals from the mixing means comprising a plurality of low pass filters connected in a sequence having successively lower upper frequency limits with the first filter of the sequence having a pass band approximately equal to one-half of the variation produced in the frequency multiplied signal by a one position change in the highest order digit of the divider division ratio, means indicating the presence of signals from each filter, and low frequency measurement means receiving signals from the last filter indicating the frequency of signals delivered thereby.

GAROLD K. JENSEN.
JAMES E. McGEOGH.

REFERENCES CITED

The following references are of record in the file of this patent:

UNITED STATES PATENTS

| Number | Name | Date |
| --- | --- | --- |
| 1,919,803 | Roetken | July 25, 1933 |
| 2,131,559 | Granger | Sept. 27, 1938 |
| 2,132,654 | Smith | Oct. 11, 1938 |
| 2,321,315 | Peterson et al. | June 8, 1943 |
| 2,380,868 | Peterson | July 31, 1945 |
| 2,501,154 | Berman | Mar. 21, 1950 |